United States Patent
Krizman, Jr.

[11] Patent Number: 6,035,741
[45] Date of Patent: Mar. 14, 2000

[54] UNIVERSAL MOUNT FOR CLAMPING A HANDLEBAR ON EXISTING STOCK HANDLEBAR CLAMPS OF MOTORCYCLES OR COMPARABLE VEHICLES

[75] Inventor: John Krizman, Jr., Lindsay, Calif.

[73] Assignee: Tucker-Rocky Corp., Inc., Wilmington, Del.

[21] Appl. No.: 09/121,749

[22] Filed: Jul. 23, 1998

Related U.S. Application Data

[62] Division of application No. 08/740,990, Nov. 5, 1996, Pat. No. 5,829,316.

[51] Int. Cl.⁷ .................................................. B62K 21/12
[52] U.S. Cl. ...................... 74/551.8; 74/551.1; 74/551.2; 74/551.3; 74/551.4; 74/551.5; 74/551.6; 74/551.7; 280/279; 280/288.4; 403/373; 403/374; 403/370; 403/371; D12/178; D12/144
[58] Field of Search .................. 74/551.1–551.8; 280/279, 288.4; 403/373, 374, 370, 371; D12/178, 144

[56] References Cited

U.S. PATENT DOCUMENTS

| | | | |
|---|---|---|---|
| D. 263,293 | 3/1982 | Janson | D12/178 |
| D. 334,164 | 3/1993 | Klieber | D12/178 |
| D. 396,835 | 8/1998 | Roddy | D12/114 X |
| 1,735,212 | 11/1929 | Pawsat . | |
| 2,063,493 | 12/1936 | Douglas . | |
| 3,832,912 | 9/1974 | Edwards . | |
| 4,291,590 | 9/1981 | Mizusaki . | |
| 4,322,087 | 3/1982 | Addicks | 280/279 |
| 4,445,704 | 5/1984 | Troxler . | |
| 5,181,774 | 1/1993 | Lane . | |
| 5,226,341 | 7/1993 | Shores . | |
| 5,235,872 | 8/1993 | Giard . | |
| 5,353,663 | 10/1994 | Samuelson . | |
| 5,429,013 | 7/1995 | Taylor et al. . | |
| 5,678,458 | 10/1997 | Kao | 74/551.3 |
| 5,881,606 | 3/1999 | Roddy | 74/551.1 X |

FOREIGN PATENT DOCUMENTS

WO 91/04903 4/1991 WIPO .
WO 91/16231 10/1991 WIPO .

*Primary Examiner*—Vinh T. Luong
*Attorney, Agent, or Firm*—Gardere & Wynne L.L.P.; John W. Montgomery

[57] ABSTRACT

An assembly of two sets of universal mounts for interlocking with stock handlebar clamps to secure a larger diameter handlebar to a motorcycle or comparable vehicles. The two sets of universal mounts are used for mounting larger diameter handlebars to motorcycles or comparable vehicles. The two sets of the universal mounts are interlocked with the stock handlebar clamps. Each set of the universal mount has an upper mount and a lower mount. Each mount has a semi-cylindrical groove, where the larger diameter handlebar is fitted between the semi-cylindrical grooves of the upper and lower mounts respectively. Each lower mount has a protruding arch which is respectively positioned within the respective stock handlebar clamp, and thereby interlocks with the respective stock handlebar clamp.

9 Claims, 7 Drawing Sheets

UNIVERSAL MOUNT FOR CLAMPING A HANDLEBAR ON EXISTING STOCK HANDLEBAR CLAMPS OF MOTORCYCLES OR COMPARABLE VEHICLES

RELATED APPLICATIONS

The present application is a divisional application of parent U.S. application Ser. No. 08/740,990, filed Nov. 5, 1996, now U.S. Pat. No. 5,829,316 issued on Nov. 3, 1998 and co-owned herewith, relied upon for priority and incorporated herein by reference for all legitimate purposes.

BACKGROUND OF THE INVENTION

1. Field of the Invention

The present invention relates to the field of handlebar mounts for motorcycles or comparable vehicles. More particularly, the present invention relates to the field of means for mounting a handlebar on existing stock handlebar clamps of motorcycles or comparable vehicles.

2. Description of the Prior Art

One of the problems with stock handlebar clamps is that they are usually constructed for clamping a stock handlebar, and therefore the rider cannot change the stock handlebar to a particular handlebar. Specifically, aftermarket manufacturers of handlebars often require special handlebar clamps for clamping their larger diameter handlebar to the motorcycle or comparable vehicle. In the past, any motorcycle or bike that had solid mounts (as opposed to rubber-mounted bar clamps) required a special handlebar clamp.

It is desirable to have a very efficient and also very effective design and construction of universal mounts for securing a particular handlebar to the motorcycle, where the universal mounts are interlocked with the stock handlebar clamps.

SUMMARY OF THE INVENTION

The present invention is an assembly of sets of universal mounts for interlocking with stock handlebar clamps to secure and clamp a particular handlebar to a motorcycle or comparable vehicles.

The present invention clamp-on-a-clamp concept is a simple and easy way to mount larger diameter handlebars to motorcycles or comparable vehicles. Each set of universal handlebar mounts is interlocked with the stock handlebar clamps. Each set of the universal mounts comprises an upper mount and a lower mount. Each mount has a semi-cylindrical groove, where a larger diameter handlebar is respectively fitted between the semi-cylindrical grooves of the upper and lower mounts. Each lower mount has a protruding arch which is respectively positioned within the respective stock handlebar clamp, and thereby interlocks with the respective stock handlebar clamp.

It is therefore an object of the present invention to provide an assembly of universal mounts which can be interlocked with stock handlebar clamps or the like for securing and clamping a particular handlebar, for example, a larger diameter handlebar, to a motorcycle or comparable vehicles.

It is a further object of the present invention to provide at least one universal mount which includes an upper portion and a lower portion and can be interlocked with stock handlebar clamps or the like for securing and clamping a particular handlebar, for example, a larger diameter handlebar, to a motorcycle or comparable vehicles.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figures 1, 2:
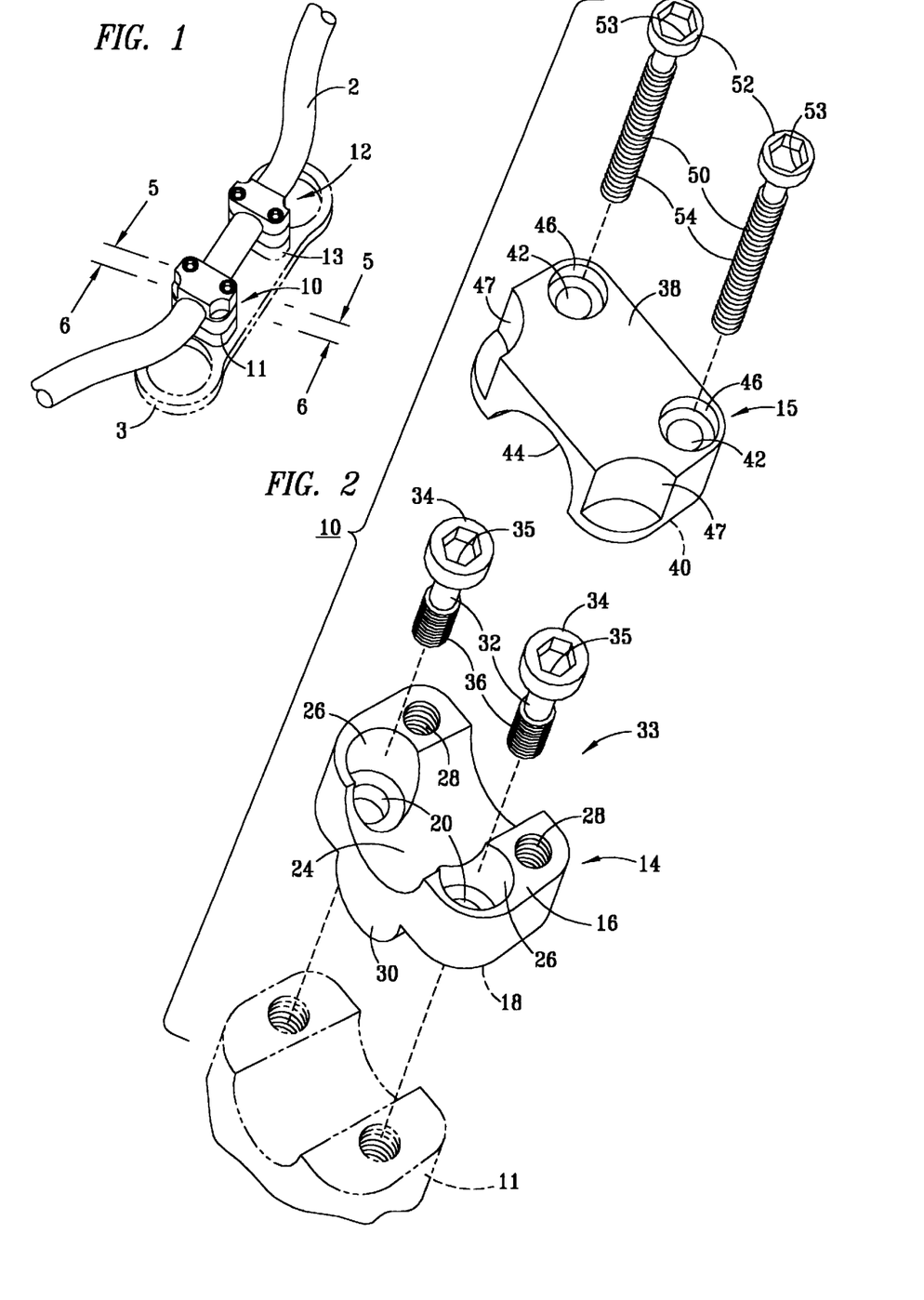
FIG. 1 as an illustration of the preferred embodiment of the present invention universal mounts, showing a handlebar clamped by the universal mounts.
FIG. 2 is an exploded perspective view of one of the universal mounts of the present invention shown in FIG. 1.

Referring to FIG. 1, there is depicted a particular handlebar 2 for a motorcycle or comparable vehicle 3 partially and schematically depicted in FIG. 1 and two sets of universal mounts 10 and 12 of the present invention, where the handlebar 2 is mounted by the two sets of the universal mounts 10 and 12 to stock handlebar clamps 11 and 13 partially and schematically shown in phantom lines in FIGS. 1 and 2 of a motorcycle or comparable vehicle. Since both sets of the universal mounts 10 and 12 are identical, only one set of the universal mount will be described in detail below.

Figure 4:
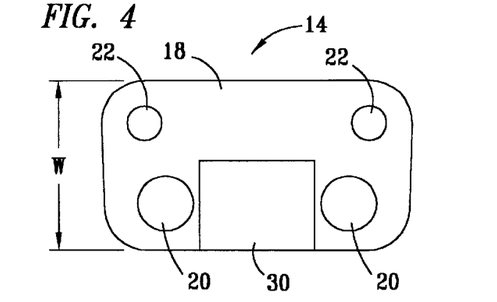
FIG. 4 is a bottom plan view of a lower mount of the respective universal mount of the present invention shown in FIG. 2.

Referring to FIG. 2, the universal mount 10 comprises a generally rectangular shaped lower mount 14 and a generally rectangular shaped upper mount 15. Now referring to FIGS. 2 and 4, the lower mount 14 has a proximal side 16, a distal side 18, two pairs of spaced apart opposite vertical interior bores 20 and 22 which extend through from the proximal side 16 to the distal side 18, and a transverse semi-cylindrical or tubular shaped groove 24 which is adjacent to the proximal side 16. Each vertical bore 20 has a countersunk cavity 26 which extends partially down within the interior bore 20 and is located adjacent to the proximal side 16 of the lower mount 14. Each vertical bore 22 has inner threads 28 therein. A protruding arch or boss shaped portion 30 is integrally attached to the distal side 18 of the lower mount 14 and located between the two vertical bores 20. The size of the protruding shaped arch portion 30 is approximately half the width W of the lower mount 14.

Figure 6:
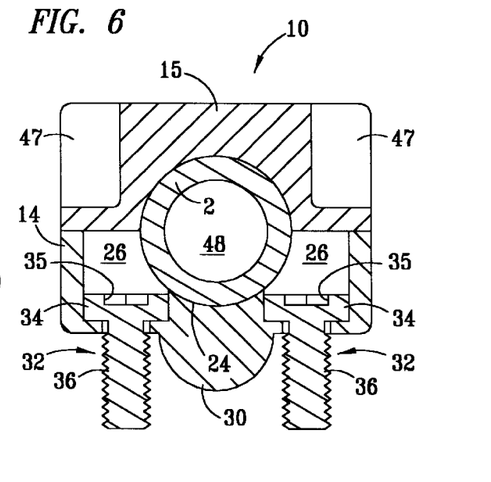
FIG. 6 is a cross-sectional view taken along line 6—6 of FIG. 1.

Referring to FIGS. 2 and 6, there are provided a pair of abbreviated or short bolt members 32 which are respectively inserted into the pair of interior vertical bores 20 of the lower mount 14 or an equivalent securing device 33 for securing the lower mount to a stock handlebar clamp 11 of a vehicle 3. Each short bolt member 32 has a widened head segment 34 and a threaded shaft segment 36. Each widened head segment 34 has a hexagonal shaped socket or any other suitable socket 35 to accommodate a driving tool for rotating the bolt member 32. Each respective shaft segment 36 extends respectively through the interior bores 20 of the lower mount 14 from the proximal side 16 of the lower mount 14 to be threadably engaged with the stock bar clamp for securing the lower mount 14 thereto. When the short bolt members 32 are secured to the stock bar clamp, the head segments 34 rest respectively within the countersunk cavities 26 of the lower mount 14 (see FIG. 6).

Figure 3:
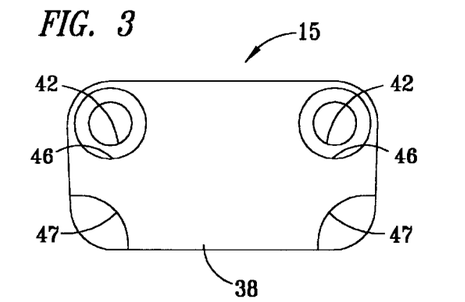
FIG. 3 is a top plan view of an upper mount of the respective universal mount of the present invention shown in FIG. 2.

Referring to FIGS. 2 and 3, the upper mount 15 has a distal side 38, a proximal side 40, a pair of opposite vertical interior bores 42 which extend through from the distal side 38 to the proximal side 40, and a complementary transverse semi-cylindrical or tubular shaped groove 44 located adjacent to the proximal side 40. Each interior bore 42 has a countersunk cavity 46 located adjacent to the distal side 38. The upper mount 15 may further have two opposite quarter-tubular shaped vertical grooves 47 which extend partially down. It will be appreciated that the upper mount 15 may be manufactured without countersunk cavities 46.

Figure 5:
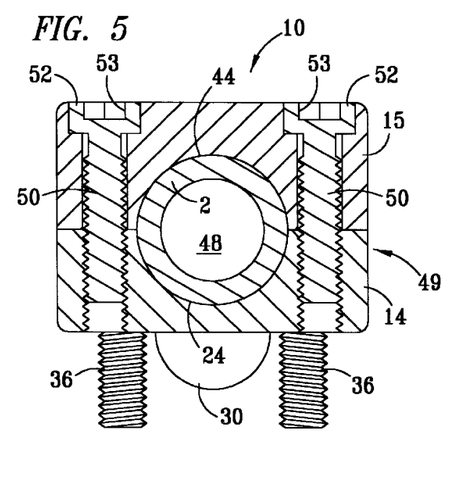
FIG. 5 is a cross-sectional view taken along line 5—5 of FIG. 1.

Referring to FIGS. 5 and 6, the upper mount 15 is positioned on top of the lower mount 14 such that the pair of vertical interior bores 42 of the upper mount 15 respectively correspond with the pair of vertical interior bores 22 of the lower mount 14, while the complementary transverse semi-cylindrical shaped groove 44 of the upper mount 15 aligns with the transverse semi-cylindrical shaped groove 24 of the lower mount 14. The two semi-cylindrical shaped grooves 24 and 44 form a full cylindrical clamp chamber 48 for clamping the handlebar 2 therein.

Referring to FIGS. 2 and 5, there are provided a pair of elongated bolts 50 which are respectively inserted into the two vertical interior bores 42 of the upper mount 15 and threadedly engaged respectively with the threads 28 on the two vertical interior bores 22 of the lower mount 14, so that the upper mount 15 is secured to the lower mount 14, and so that the handlebar 2 is fastened to the vehicles 3 as it is clamped within the full cylindrical chamber 48 upon tightening bolts 50. Each elongated bolt member 50 has a widened head segment 52 and a threaded shaft segment 54. Each widened head segment 52 has a hexagonal head, socket or any other type of configuration 53 to accommodate a driving tool for rotating the bolt member 50. Each shaft segment 54 threadedly engages respectively with a respective one of the pair of interior bores 22 of the lower mount 14 from the proximal side 16 of the lower mount 14 (see FIG. 5). When the bolt members 50 are secured to the lower mount 14, the head segments 52 rest respectively within the countersunk cavities 46 of the upper mount 15. Alternatively, the upper mount 15 will not have countersunk cavities 46 and the bolt members 50 will be flat head bolts.

The present invention conforms to conventional forms of manufacture or any other conventional way known to one skilled in the art, and is of simple construction and is easy to use. By way of example, the upper and lower mounts 15 and 14 can be made of metal material or any other suitable material, for example, plastic or carbon fiber.

It will be appreciated that the universal mounts 10 and 12 are not limited to the shape illustrated in FIGS. 1 through 6. It is emphasized that while the shape illustrated in FIGS. 1 through 6 is preferred, it is also within the spirit and scope of the present invention to have a multiplicity of different shaped universal mounts as shown in FIGS. 7 through 12.

Figure 7:
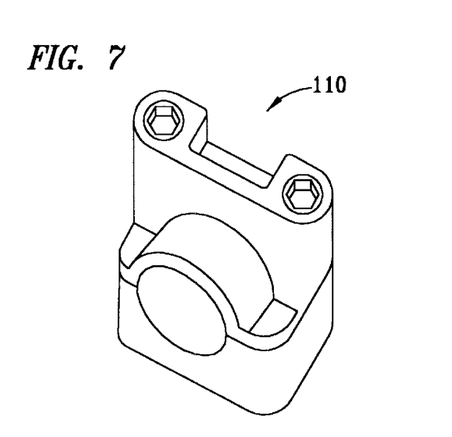
FIG. 7 illustrates an alternative embodiment of the present invention universal mount.
Figure 8:
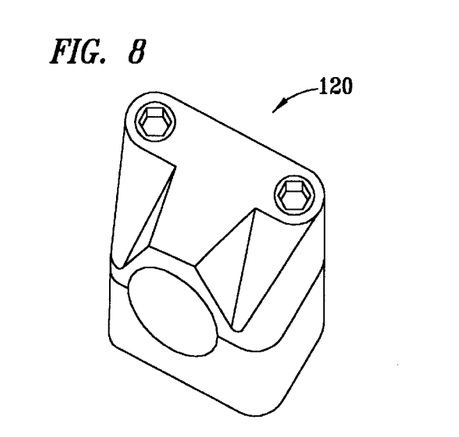
FIG. 8 illustrates an another alternative embodiment of the present invention universal mount.
Figure 9:
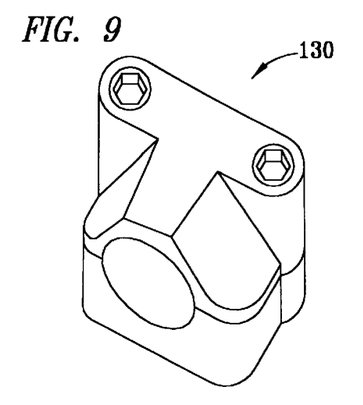
FIG. 9 illustrates still another alternative embodiment of the present invention universal mount.
Figure 10:
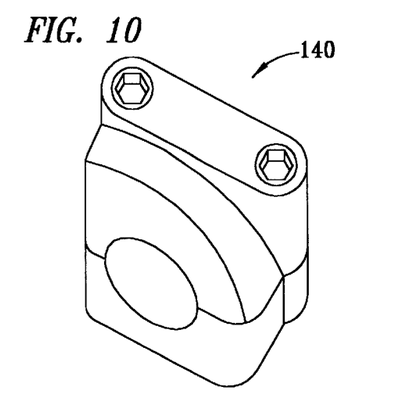
FIG. 10 illustrates still another alternative embodiment of the present invention universal mount.
Figure 11:
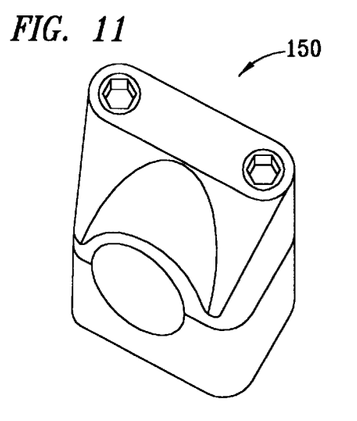
FIG. 11 illustrates still another alternative embodiment of the present invention universal mount.
Figure 12:
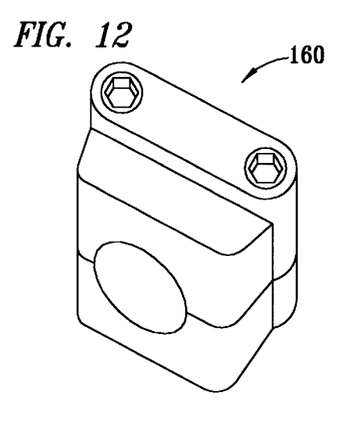
FIG. 12 illustrates still another alternative embodiment of the present invention universal mount.

In FIGS. 7 through 12, the universal mounts are similar to the previously described embodiment shown in FIGS. 1 through 6, and the description thereof will not be repeated FIG. 7 illustrates an alternative embodiment of the present invention universal mount 110; FIG. 8 illustrates another alternative embodiment of the present invention universal mount 120; FIG. 9 illustrates still another alternative embodiment of the present invention universal mount 130; FIG. 10 illustrates still another alternative embodiment of the present invention universal mount 140; FIG. 11 illustrates still another alternative embodiment of the present invention universal mount 150; and FIG. 12 illustrates still another alternative embodiment of the present invention universal mount 160. The internal arrangement and structure of these alternative embodiments are substantially the same or identical, while the external appearances are different.

Referring to FIGS. 7, 8, 9, 11 and 12, these alternative embodiments function as a set which include identical left and right universal mounts, while the embodiment shown in FIG. 10, the left and right universal mounts are identical mirror images of each other.

Figure 13:
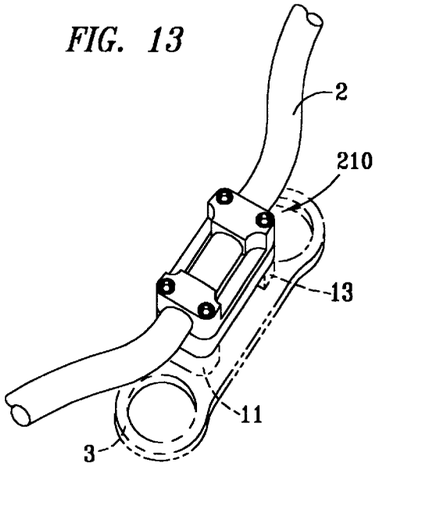
FIG. 13 is an illustration of still a further alternative embodiment of the present invention universal mount, showing a handlebar clamped by the universal mount.
Figure 14:
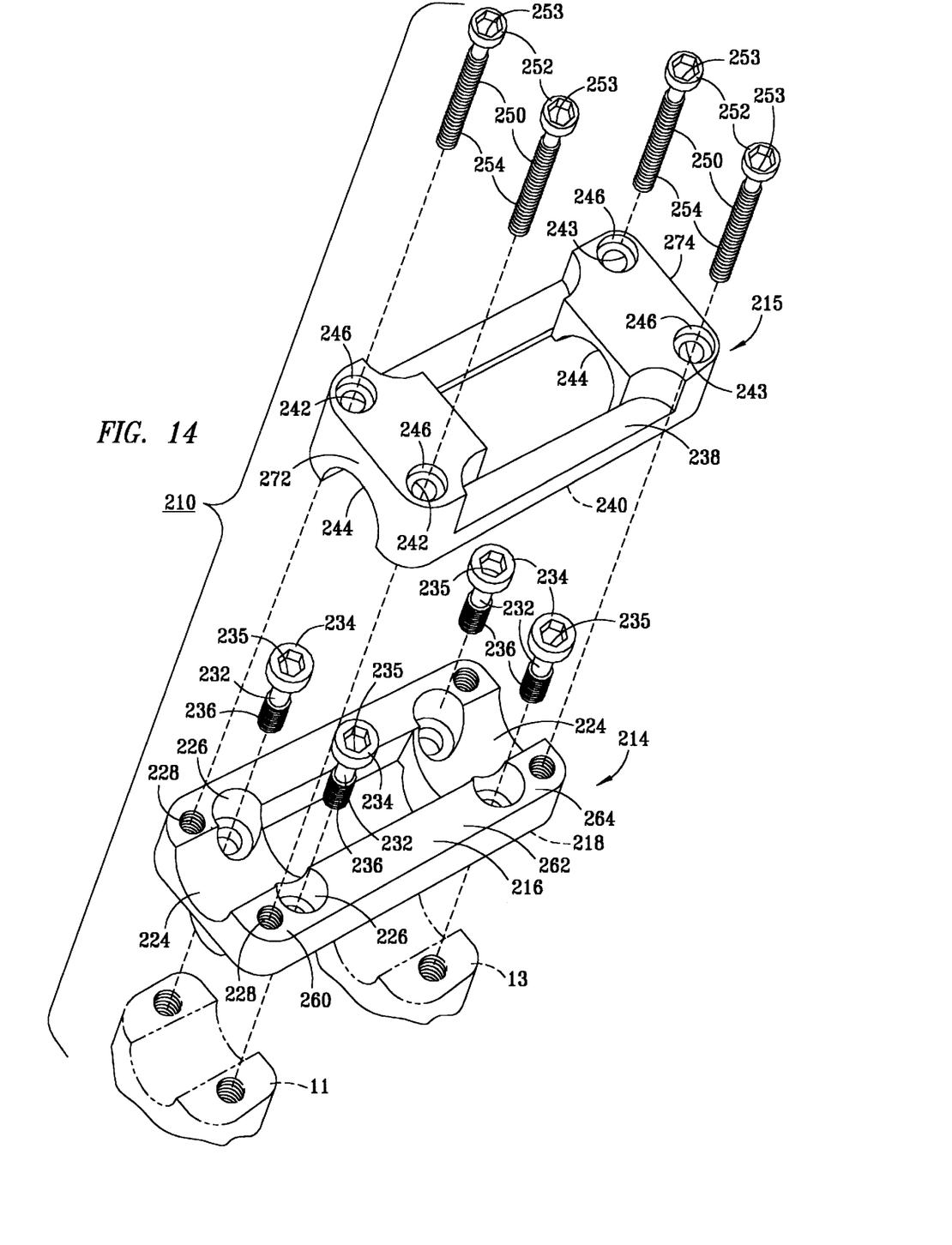
FIG. 14 is an exploded perspective view of the universal mount shown in FIG. 13.
Figure 15:
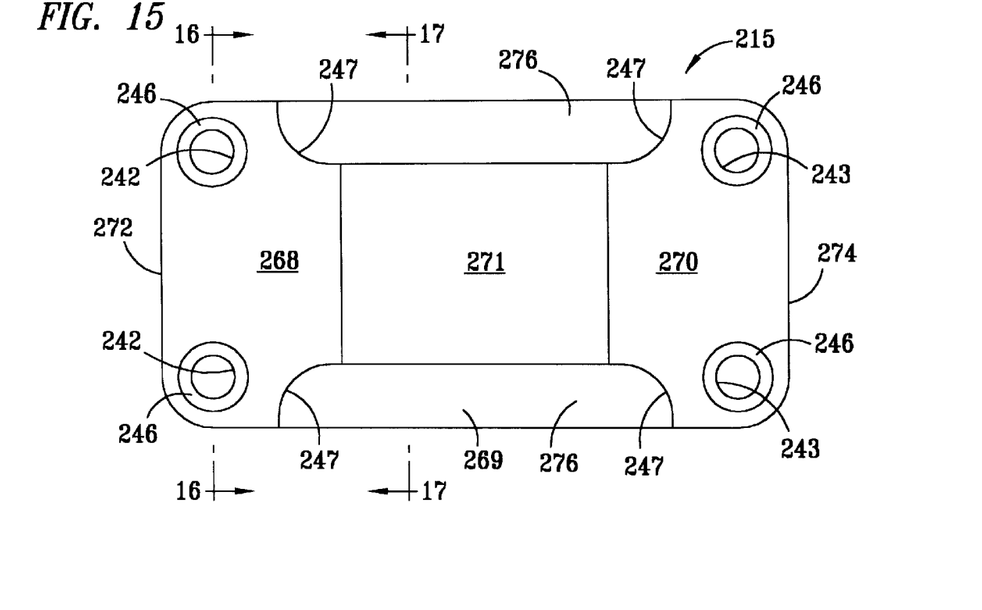
FIG. 15 is a top plan view of an upper mount of the present invention universal mount shown in FIG. 14.
Figure 16:
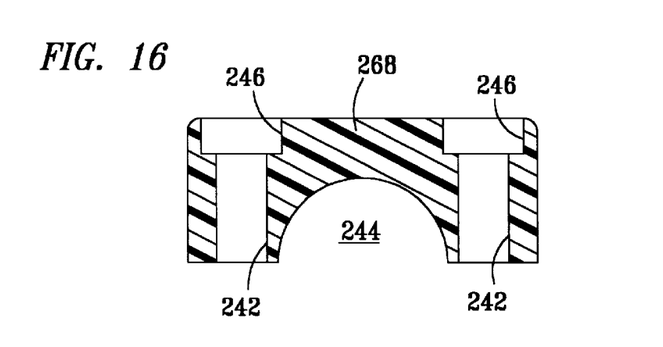
FIG. 16 is a cross-sectional view taken along line 16—16 of FIG. 15.
Figure 17:
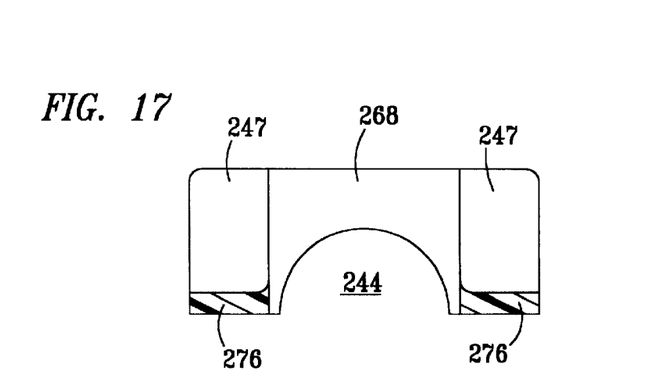
FIG. 17 is a cross-sectional view taken along line 17—17 of FIG. 15.
Figure 18:
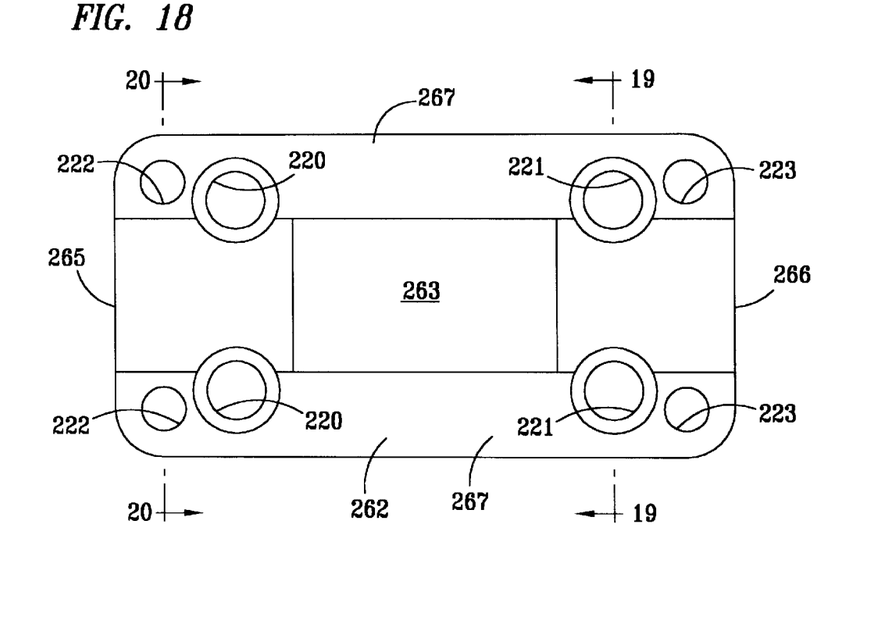
FIG. 18 is a top plan view of a lower mount of the present invention universal mount shown in FIG. 14.
Figure 19:
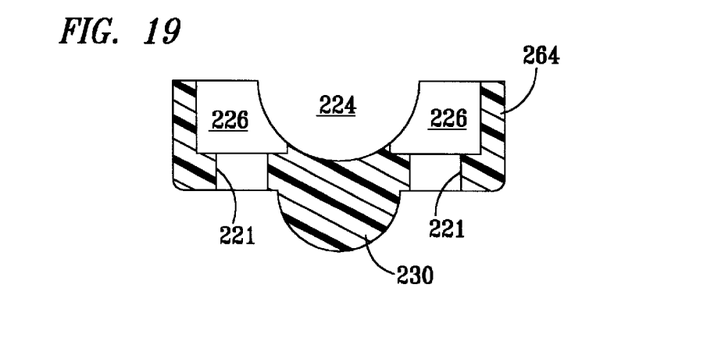
FIG. 19 is a cross-sectional view taken along line 19—19 of FIG. 18.
Figure 20:
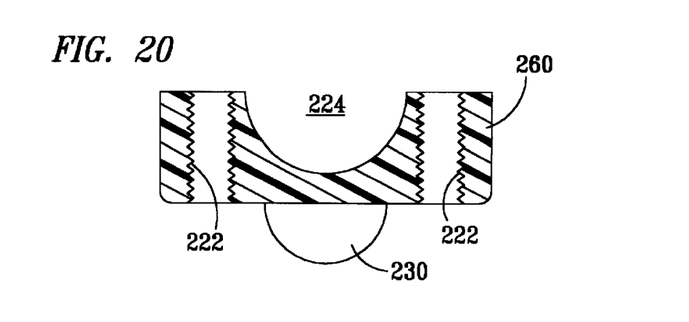
FIG. 20 is a cross-sectional view taken along line 20—20 of FIG. 18.

Referring to FIG. 13, there is depicted a larger diameter handlebar 2 for a motorcycle or comparable vehicle 3 and an alternative embodiment of the present invention universal mount 2 10, where the handlebar 2 is mounted by the universal mount 210 to stock handlebar clamps 11 and 13 of the motorcycle 3 or comparable vehicle, Referring to FIG. 14, there is shown an exploded view of the present invention universal mount 210. In this embodiment, the universal mount 210 comprises a generally rectangular unitary lower mount 214 and a generally rectangular unitary upper mount 215. Now referring to FIGS. 14, 18, 19 and 20, the lower mount 214 has a first section 260, a middle section 262, a second section 264, a proximal side 216, a distal side 218, first and second pairs of spaced apart opposite vertical interior bores 220 and 222 which are located adjacent to one end 265 of the lower mount 214 and extend through from the proximal side 216 to the distal side 218, and third and fourth pairs of spaced apart opposite vertical interior bores 221 and 223 which are located adjacent the other end 266 of the lower mount 214 and extend through from the proximal side 216 to the distal side 218. The middle section 262 has a hollow space 263 with two opposite parallel aligned bars 267 integrally connecting the first and second sections 260 and 264 of the lower mount 214. Each vertical bore 220 and 221 has a countersunk cavity 226 which extends partially down within the interior bore 220, 221 and is located adjacent to the proximal side 216 of the lower mount 214. Each vertical bore 222 and 223 has inner threads 228 therein. The first and second sections 260 and 264 each have a semi-cylindrical or tubular shaped groove 224 which extends in the lengthwise direction of the lower mount 214 and located on the proximal side 216. Each section has a protruding arch or boss shaped portion 230 which is integrally attached to the distal side 218 of the lower mount 214 and located between the two pairs of vertical bores 220 and 221 respectively for mating with corresponding mounts 11 and 13 on the motorcycle 3.

Referring to FIG. 14, there are provided two pairs of short bolt members 232 which are respectively inserted into the two pairs of interior vertical bores 220 and 221 of the lower mount 214 for securing the lower mount to stock handlebar clamps 11 and 13. Each short bolt member 232 has a widened head segment 234 and a threaded shaft segment 236. Each widened head segment 234 has a hexagonal shaped socket or any other suitable configuration socket 235 to accommodate a driving tool for rotating the bolt member 232. Each respective shaft segment 236 extends respectively through the interior bores 220 and 221 of the lower mount 214 from the proximal side 216 to be threadably engaged with the stock bar clamp for fastening the lower mount 214 thereto. When the short bolt members 232 are secured to the stock bar clamps, the head segments 234 rest respectively within the countersunk cavities 226 of the lower mount 214.

Referring to FIGS. 14 through 17, the upper mount 215 has a first section 268, a middle section 269, a second section 270, a distal side 238, a proximal side 240, a first pair of opposite vertical interior bores 242 which is located adjacent to one end 272 of the upper mount 215 and extend through from the distal side 238 to the proximal side 240, and a second pair of opposite vertical interior bores 243 which is located adjacent to the other end 274 of the upper mount 215 and extend through from the distal side 238 to the proximal side 240. The middle section 269 has a hollow space 271 with two opposite parallel aligned bars 276 integrally connecting the first and second sections 268 and 270 of the upper mount 215. Each interior bore 242 and 243 has a countersunk cavity 246 located on the distal side 238 of the upper mount 215. The first and second sections 268 and 270 each have a complementary semi-cylindrical or tubular shaped groove 244 which extends in the lengthwise direction of the upper mount 215 and is located on the proximal side 240. The upper mount 215 may further have quarter-tubular shaped vertical grooves 247 which extend partially downward toward the opposite parallel aligned bars 276 for reducing the weight of the upper mount 215. It will be appreciated that the upper mount 215 may be manufactured without countersunk cavities 246.

Figure 21:
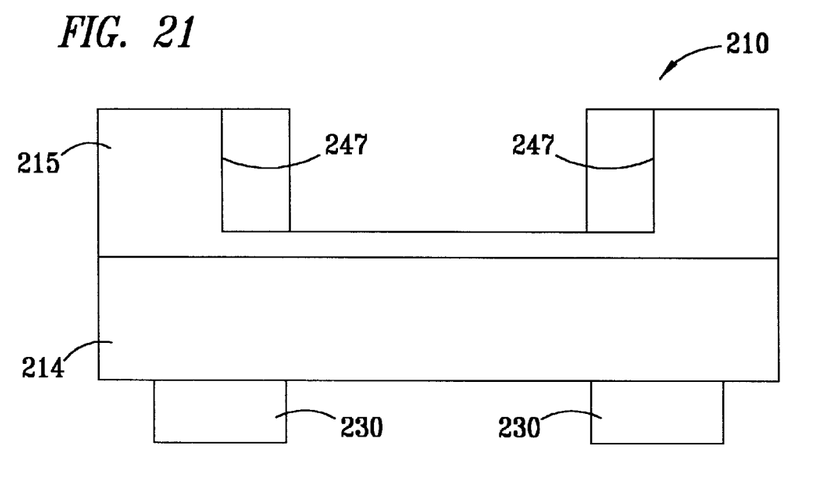
FIG. 21 is a side elevational view of the present invention universal mount shown in FIG. 14.
Figure 22:
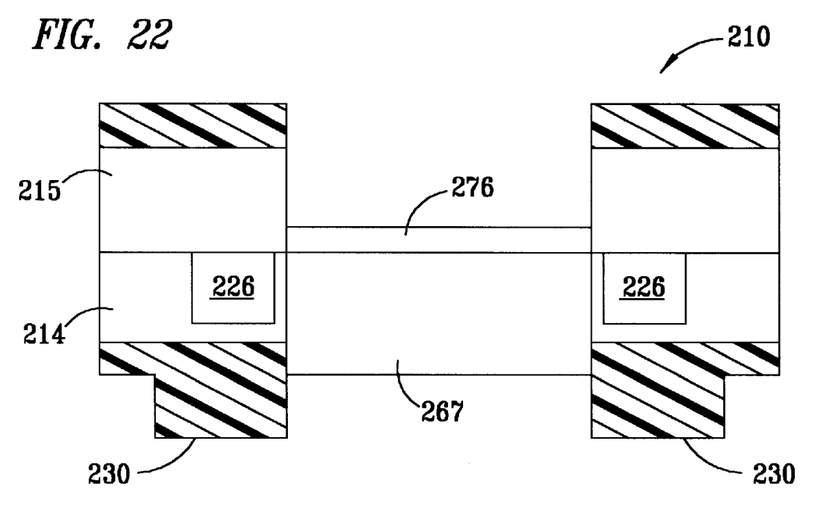
FIG. 22 is a cross-sectional view of the present invention universal mount shown in FIG. 14.

Referring to FIGS. 21 and 22, the upper mount 215 is positioned on top of the lower mount 214 such that the pairs of vertical interior bores 242 and 243 of the upper mount 215 respectively correspond with the pairs of vertical interior bores 222 and 223 of the lower mount 214, while the complementary semi-cylindrical shaped grooves 244 of the upper mount 215 aligns with the semi-cylindrical shaped grooves 224 of the lower mount 214, thereby forming a full cylindrical chamber in the lengthwise direction for clamping the handlebar 2 therein.

Referring to FIG. 14, there are provided elongated bolt members 250 which are respectively inserted into the vertical interior bores 242 and 243 of the upper mount 215 and threadedly engaged respectively with the threads 228 on the vertical interior bores 222 and 223 of the lower mount 214, so that the upper mount 215 is secured to the lower mount 214, so that the handlebar 2 is secured within the full cylindrical chamber. Each elongated bolt member 250 has a widened head segment 252 and a threaded shaft segment 254. Each widened head segment 252 has a hexagonal head, socket or any other type of configuration 253 to accommodate a driving tool for rotating the bolt member 250. Each shaft segment 254 threadedly engages respectively with a respective one of the pairs of interior bores 222 and 223 of the lower mount 214 from the proximal side 216 of the lower mount 214. When the bolt members 250 are secured to the lower mount 214, the head segments 252 rest respectively within the countersunk cavities 246 of the upper mount 215. Alternatively, the upper mount 215 will not have countersunk cavities 246 and the bolt members 250 will be flat head bolts.

The upper and lower mounts 215 and 214 can be made of metal material or any other suitable material, for example plastic or carbon fiber.

Defined in detail, the present invention is an apparatus for mounting a handlebar on stock handlebar clamps of a vehicle, the apparatus comprising: (a) two identical sets of universal mounts, each having a lower mount and an upper mount; (b) the lower mount of each the universal mount having a proximal side, a distal side, first and second pairs of spaced apart opposite vertical interior bores extending through from the proximal side to the distal side, and a transverse semi-cylindrical groove located on the proximal side, the first pair of vertical interior bores each having a countersunk cavity located adjacent to the proximal side of the lower mount, and the second pair of vertical interior bores each having internal threads; (c) the lower mount of each the universal mount having a protruding arch shaped portion integrally formed on the distal side and located between the first pair of interior bores and extending approximately half the width of the lower mount of each the universal mount; (d) a pair of abbreviated bolt members respectively inserted through the first pair of interior bores of the lower mount of each the universal mount for securing the lower mount of each the universal mount to a respective one of the stock handlebar clamps; (e) the upper mount of each the universal mount having a proximal side, a distal side, a pair of opposite vertical interior bores extending through from the distal side to the proximal side and a complementary transverse semi-cylindrical groove located on the proximal side of the upper mount, the pair of vertical bores each having a countersunk cavity located adjacent to the distal side of the upper mount of each the universal mount; (f) the upper mount of each the universal mount being positioned on top of the lower mount of each the universal mount such that the pair of vertical bores of the upper mount of each the universal mount respectively correspond with the second pair of vertical bores of the lower mount of each the universal mount, and the complementary transverse semi-cylindrical groove of the upper mount of each the universal mount aligns with the transverse semi-cylindrical groove of the lower mount of each the universal mount and thereby forms a fill cylindrical chamber for clamping the handlebar therein; and (g) a pair of elongated bolt members respectively inserted through the pair of interior bores of the upper mount of each the universal mount and threadedly engaged with the second pair of interior bores of the lower mount of each the universal mount, thereby securing the upper mount of each the universal mount to the lower mount of each the universal mount such that the handlebar is secured within the full cylindrical chamber.

Defined broadly, the present invention is an apparatus for mounting a handlebar on stock handlebar clamps of a vehicle, the apparatus comprising: (a) two sets of universal mounts, each having a lower mount and an upper mount; (b) the lower mount of each the universal mount having a proximal side, a distal side, first and second pairs of bores extending through from the proximal side to the distal side, and a semi-tubular groove located on the proximal side, the first pair of bores each having a countersunk cavity located adjacent to the proximal side, and the second pair of bores each having internal threads; (c) a first pair of bolt members respectively inserted through the first pair of bores of the lower mount of each the universal mount for securing the lower mount of each the universal mount to a respective one of the handlebar clamps; (d) the upper mount of each the universal mount having a proximal side, a distal side, a pair of bores extending through from the distal side to the proximal side and a complementary semi-tubular groove located on the proximal side; (e) the upper mount of each the universal mount being positioned on top of the lower mount of each the universal mount such that the pair of bores of the upper mount of each the universal mount respectively correspond with the second pair of bores of the lower mount of each the universal mount and the complementary semi-tubular groove of the upper mount of each the universal mount aligns with the semi-tubular groove of the lower mount of each the universal mount and thereby forms a full tubular chamber for clamping the handlebar therein; and (f) a second pair of bolt members respectively inserted through the pair of bores of the upper mount of each the universal mount and threadedly engaged with the second pair of bores of the lower mount of each the universal mount, thereby securing the upper mount of each the universal mount to the lower mount of each the universal mount such that the handlebar is secured within the full tubular chamber.

Defined more broadly, the present invention is an apparatus for mounting a handlebar on clamping means of a vehicle, the apparatus comprising: (a) two universal mounts, each having a lower mount and an upper mount; (b) the lower mount of each the universal mount having a groove; (c) means for securing the lower mount of each the universal mount to the clamping means of the vehicle respectively; (d) the upper mount of each the universal mount having a complementary groove, such that when the upper mount of each the universal mount is being positioned on top of the lower mount of each the universal mount, the complementary groove of the upper mount of each the universal mount aligns with the groove of the lower mount of each the universal mount and thereby forms a fastening means for fastening the handlebar therein; and (e) means for securing the upper mount of each the universal mount to the lower mount of each the universal mount such that the handlebar is secured within the fastening means.

Defined even more broadly, the present invention is an apparatus for mounting a handlebar on clamping means of a vehicle, the apparatus comprising: (a) a lower portion having a groove; (b) means for securing the lower portion to the clamping means of the vehicle; (c) an upper portion having a complementary groove such that when the upper portion is being positioned on top of the lower portion, the complementary groove aligns with the groove of the lower portion and thereby forms a fastening means for fastening the handlebar thereto; and (d) means for securing the upper portion to the lower portion such that the handlebar is secured within the fastening means.

Alternatively defined in detail, the present invention is an apparatus for mounting a handlebar on stock handlebar clamps of a vehicle, the apparatus comprising: (a) an elongated lower mount having a proximal side, a distal side, first and second pairs of interior bores located adjacent to one end of the lower mount and extending through from the proximal side to the distal side, third and fourth pairs of interior bores located adjacent to the other end of the lower mount, and an elongated semi-cylindrical groove extending the lengthwise direction of the lower mount and located on the proximal side, the first and third pairs of interior bores each having a countersunk cavity located on the proximal side of the lower mount, and the second and fourth pairs of interior bores each having internal threads; (b) a pair of opposite protruding arch shaped portions integrally formed on the distal side of the lower mount and located between the first and third pairs of interior bores; (c) a short bolt member respectively inserted through the first and third pairs of interior bores of the lower mount for securing the lower mount to the stock handlebar clamps; (d) an elongated upper mount having a proximal side, a distal side, a first pair of interior bores located at one end of the upper mount and extending through from the distal side to the proximal side, a second pair of interior bores located at the other end of the upper mount and extending through from the distal side to the proximal side, and a complementary semi-cylindrical groove extending in the lengthwise direction of the upper mount and located on the proximal side of the upper mount, the first and second pair of interior bores of the upper mount each having a countersunk cavity located on the distal side; (e) the upper mount being positioned on top of the lower mount such that the first and second pairs of interior bores of the upper mount respectively correspond with the second and fourth pairs of interior bores of the lower mount, and the complementary semi cylindrical groove of the upper mount aligns with the semi-cylindrical groove of the lower mount and thereby forms a full cylindrical chamber for clamping the handlebar therein; and (f) an elongated bolt member respectively inserted through the first and second pairs of 18 interior bores of the upper mount and threadedly engaged with the second and fourth pairs of interior bores of the lower mount, thereby securing the upper mount to the lower mount such that the handlebar is secured within the full cylindrical chamber.

Alternatively defined broadly, the present invention is an apparatus for mounting a handlebar on clamping means of a vehicle, the apparatus comprising: (a) a lower portion having a proximal side, a distal side, first and second pairs of bores located adjacent to one end of the lower portion, third and fourth pairs of bores located adjacent to the other end of the lower portion, and a groove located on the proximal side; (b) a first bolt member respectively inserted through the first and third pairs of bores of the lower portion for securing the lower portion to the clamping means; (c) an upper portion having a proximal side, a distal side, a first pair of bores located at one end of the upper portion, a second pair of bores located at the other end of the upper portion, and a complementary groove located on the proximal side; (d) the upper portion being positioned on top of the lower portion such that the first and second pairs of bores of the upper portion respectively correspond with the second and fourth pairs of bores of the lower portion and the complementary groove of the upper portion aligns with the groove of the lower portion and thereby forms a full tubular chamber for clamping the handlebar therein; and (e) a second bolt member respectively inserted through the first and second pairs of bores of the upper portion and engaged with the second and fourth pairs of bores of the lower portion, thereby securing the upper portion to the lower portion such that the handlebar is secured within the full tubular chamber.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modifications in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. An apparatus for mounting a handlebar on stock handlebar clamps of a vehicle, the apparatus comprising
   a) an elongated lower mount having a proximal side, a distal side, first and second pairs of interior bores located adjacent to one end of the lower mount and extending through from the proximal side to the distal side, third and fourth pairs of interior bores located adjacent to the other end of the lower mount, and a semi-cylindrical groove extending in the lengthwise direction and located on the proximal side, the first and third pairs of interior bores each having a countersunk cavity located on the proximal side of the lower mount, and the second and fourth pairs of interior bores each having internal threads;
   b) a pair of opposite protruding arch shaped portions integrally formed on said distal side of said lower mount and located between said first and third pairs of interior bores respectively;
   c) a short bolt member respectively inserted through said first and third pairs of bores of said lower mount for securing said lower mount to said stock handlebar clamps;
   d) an elongated upper mount having a proximal side, a distal side, a first pair of interior bores located at one end of the upper mount and extending through from the distal side to the proximal side, a second pair of interior bores located at the other end of the upper mount and extending through from the distal side to the proximal side, and a complementary semi-cylindrical groove extending in the lengthwise direction of the upper mount and located on the proximal side, the first and second pair of interior bores of the upper mount each having a countersunk cavity located on the distal side;
   e) said upper mount being positioned on top of said lower mount such that said first and second pairs of interior bores of said upper mount respectively correspond with said second and fourth pairs of interior bores of said lower mount, and said complementary semi-cylindrical groove of said upper mount aligns with said semi-cylindrical groove of said lower mount and thereby forms a full cylindrical chamber for clamping said handlebar therein; and
   f) an elongated bolt member respectively inserted through said first and second pairs of interior bores of said upper mount and threadedly engaged with said second and fourth pairs of interior bores of said lower mount, thereby securing said upper mount to said lower mount such that said handlebar is secured within said full cylindrical chamber.

2. The apparatus in accordance with claim 1 wherein said upper and lower mounts are constructed of metal material.

3. The apparatus in accordance with claim 1 wherein said upper and lower mounts are constructed of plastic material.

4. The apparatus in accordance with claim 1 wherein said upper and lower mounts are constructed of carbon fiber.

5. An apparatus for mounting a handlebar on clamping means of a vehicle, the apparatus comprising:
   a) lower portion having a proximal side, a distal side, first and second pairs of bores located adjacent to one end of the lower portion, third and fourth pairs of bores located adjacent to the other end of the lower portion, and a groove located on the proximal side;
   b) a first bolt member respectively inserted through said first and third pairs of bores of said lower portion for securing said lower portion to said clamping means;
   c) an upper portion having a proximal side, a distal side, a first pair of bores located at one end of the upper portion, a second pair of bores located at the other end of the upper portion, and a complementary groove located on the proximal side;
   d) said upper portion being positioned on top of said lower portion such that said first and second pairs of bores of said upper portion respectively correspond with said second and fourth pairs of bores of said lower portion and said complementary groove of said upper portion aligns with said groove of said lower portion and thereby forms a full tubular chamber for clamping said handlebar therein; and
   e) a second bolt member respectively inserted through said first and second pairs of bores of said upper portion and engaged with said second and fourth pairs of bores of said lower portion, thereby securing said upper portion to said lower portion such that said handlebar is secured within said full tubular chamber.

6. The apparatus in accordance with claim 5 wherein said upper and lower portions are constructed of metal material.

7. The apparatus in accordance with claim 5 wherein said upper and lower portions are constructed of plastic material.

8. The apparatus in accordance with claim 5 wherein said upper and lower portions are constructed of carbon fiber.

9. The apparatus in accordance with claim 5 wherein said lower portion further comprises at least two opposite protruding arch shaped portions integrally formed on said distal side and located between said first and third pairs of bores.

* * * * *